United States Patent

Martin et al.

[11] Patent Number: 5,882,387
[45] Date of Patent: Mar. 16, 1999

[54] POLISH COMPOSITION

[75] Inventors: Eugene R. Martin, Onsted; Michael D. Lowery, Tecumseh, both of Mich.

[73] Assignee: Wacker Silicones Corporation, Adrian, Mich.

[21] Appl. No.: 906,849

[22] Filed: Aug. 6, 1997

Related U.S. Application Data

[63] Continuation-in-part of Ser. No. 703,274, Aug. 26, 1996, abandoned.

[51] Int. Cl.$^6$ ........................................ C09G 1/16
[52] U.S. Cl. ........................... 106/3; 106/10; 106/287.14; 528/33; 528/10; 556/406; 556/434; 556/450; 556/453; 556/458; 556/560
[58] Field of Search .......................... 106/3, 10, 287.12, 106/287.14; 528/33, 10; 556/406, 434, 450, 453, 458, 460

[56] References Cited

U.S. PATENT DOCUMENTS 4,743,648  5/1988  Hill et al. ........................ 106/287.14

FOREIGN PATENT DOCUMENTS 200009  11/1986  European Pat. Off. .......... 106/287.14

*Primary Examiner*—Melissa Bonner
*Attorney, Agent, or Firm*—Brooks & Kushman P.C.

[57] ABSTRACT

The present invention relates to a wipe-on polish composition which contains no wax or abrasive components. The polish requires minimal effort to wipe out to a thin, glossy, streak-free, hydrophobic film. The polish is comprised of an emulsion that contains an organopolysiloxane and a volatile diluent.

12 Claims, No Drawings

POLISH COMPOSITION

The application is a continuation-in-part of application Ser. No. 08/703,274, filed on Aug. 26, 1996, now abandoned.

FIELD OF INVENTION

The present invention relates to compositions useful as polishes for paint and plastic surfaces and in particular for automotive surfaces. The compositions are in the form of an emulsion and are typically comprised of a fluid organopolysiloxane, a volatile diluent, an emulsifier and water. The compositions are easily applied and removed from paint and plastic surfaces with minimal wiping leaving a dust-free, streak-free, glossy finish.

BACKGROUND OF INVENTION

Typically polish compositions used to polish automotive surfaces, especially automotive paint surfaces, contain a wax and an abrasive component Application of these polish compositions require allowing the polish to dry and removing the film by buffing. US 4,398,953 discloses an improved silicone containing polish containing a montan wax, an emulsifier, silicone oil, amino silicones, finely divided abrasive, water and a volatile aliphatic hydrocarbon liquid where the hydrocarbon has an evaporation rate three to five times faster than water. The polish composition is applied to the surface of an automobile, allowed to dry to a haze and buffed off. The amount of time and effort to apply these conventional polishes has discouraged many consumers from using these products.

In addition to the effort involved in removing the dried abrasive containing compositions, there are other disadvantages. Paint technology has changed significantly and at present, abrasives are in many cases too aggressive and tend to scratch the paint surface. However, simply removing the abrasives from formulations is not a viable alternative. Abrasives aid in the even distribution of silicone film forming components thereby reducing the tendency to streak. Removing them tends to increase streaking which is not desirable from a consumer's point of view. A great deal of research has gone into developing polish compositions that are free from abrasives yet do not streak or smear.

U.S. Pat. No. 4,013,475 discloses a water-in-oil double emulsion for treating hard surfaces that consists of an organic solvent, an organopolysiloxane, a water-in-oil emulsifier mixed with an oil-in-water emulsion containing wax particles dispersed throughout a continuous aqueous phase.

U.S. Pat. No. 4,354,871, developed as a polish for furniture, discloses an emulsion that contains a film-former such as a silicone, wax, resin, non-drying oil and mixtures thereof, a hydrocarbon solvent having a boiling point range of from 80° to 200° C., water and an alpha-olefin having from 10 to 18 carbon atoms.

Two related patents U.S. Pat. No. 4,936,914 and U.S. Pat. No. 5,112,394 disclose polish compositions requiring a combination of specific siloxane copolymers, hydrocarbon solvents having boiling point ranges between 60° and 210° C., a surfactant and water.

U.S. Pat. No. 5,470,504 discloses a non-aqueous, wax free polish composition that cleans without abrasives. The composition consists of a low viscosity siloxane polymer, a surface bonding enhancer, a lower alkyl alcohol and d-limonene.

It is the object of the present invention to provide a polish composition that is easy to apply and wipes off with little or no buffing, and provides a streak free, glossy finish.

It is a further object of the present invention to provide a composition that is relatively simple to prepare.

The foregoing objects and any others that become apparent were accomplished by the discovery of a silicone containing wipe-on polish composition that can be easily applied and requires minimal effort to wipe out to a thin, glossy, streak free, hydrophobic film. There is no need to wait for the polish to dry and no dusty residues are formed.

SUMMARY OF INVENTION

The present invention relates to a wipe-on polish composition which contains no wax or abrasive component, containing an emulsion comprising, A. 0.25 to 20 weight percent of a fluid organopolysiloxane of the formula $$(R_a SiO_{4-a/2})_n \quad (I)$$

R is independently a monovalent hydrocarbon radical having from 1 to 18 carbon atoms, an hydroxyl radical or a hydrocarbonoxy radical having from 1 to 18 carbon atoms, a is on average from 0.7 to 2.6 per unit of the organopolysiloxane of formula (I), and n is from 2 to 400

B. 0.6 to 30 weight percent of a volatile diluent having a boiling point of 205° to 350° C. at atmospheric pressure and in which the organopolysiloxane of formula (I) is soluble, C. 0.2 to 8 weight percent of an emulsifier, D. 30 to 96.75 weight percent water, and E. 0 to 20 weight percent of additives selected from the group consisting of gloss enhancers, antifoam agents, perfumes, bacteriostats and coloring agents, where the weight percent is based on the total weight of the polish composition. The polish composition may comprise from 100% by weight to 4% by weight of the emulsion, any remainder being water.

The fluid organopolysiloxanes of formula (I) are all corresponding siloxanes known in the art and are prepared by conventional means. The fluid organopolysiloxanes of formula (I) are characterized as having a low viscosity, which does not exceed 1,000 centistokes at 25° C. Examples where R is a hydrocarbon having from 1 to 18 carbon atoms include alkyl radicals, such as the methyl, ethyl, n-propyl, iso-propyl, n-butyl, iso-butyl, tert-butyl, n-pentyl, iso-pentyl, neo-pentyl and tert-pentyl radical, hexyl radicals, such as the n-hexyl radical, heptyl radicals such as the n-heptyl radical, octyl radicals, such as the n-octyl radical and iso-octyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical; alkenyl radicals, such as the vinyl and the allyl radical; cycloalkyl radicals, such as cyclopentyl, cyclohexyl and cycloheptyl radicals and methylcyclohexyl radicals; aryl radicals such as the phenyl, naphthyl and anthryl and phenanthryl radical; alkaryl radicals, such as o-, m- and p-tolyl radicals, xylyl radicals and ethylphenyl radicals and aralkyl radicals, such as the benzyl radical and the α- and the β-phenylethyl radical.

Examples where R is a hydrocarbonoxy radical having from 1 to 18 carbon atoms include all of the above examples given for R as a hydrocarbon where the hydrocarbon is attached to a silicon atom via an oxygen atom.

Preferred organopolysiloxanes are those consisting of units of formula $$HOR_2SiO(R_2SiO)_nH \qquad \text{(II)}$$

where R is an alkyl radical and n is from 2 to 400. It is especially preferred when R is a methyl radical.

The organopolysiloxanes (A) are prepared by methods well known to those skilled in the art. General methods for preparing organopolysiloxanes are found in "Chemistry and Technology of Silicones", ch. 5 pp 190–245; Noll (1968).

Component (B) of the emulsion is a diluent The diluent used in the emulsion has a boiling point range at atmospheric pressure of from 205° to 350° C. A preferred range is from 205° to 275° C. Another preferred range is from about 213° C. to 275° C. If the boiling point of the diluent is less than 200° C. or greater than 350° C., a streaky film is obtained. According to the invention, the organopolysiloxane (A) must be soluble in the diluent (B). If the silicone is not soluble in the diluent, a streaky film will result Diluents suitable for use in the present invention include, but are not limited to, cyclic methylsiloxanes having more than 4 silicon atoms such as decamethylcyclopentasiloxane, having a boiling point of about 205° C., alpha olefins having 12 to 18 carbon atoms such as 1-dodecene or 1-tetradecene, where the dodecene has a boiling point of about 213° C. and hydroxybenzoic acid esters such as methyl salicylate having a boiling point of 223.3° C.

The emulsifiers used in the present invention may be any type known to be useful in preparing oil-in-water type emulsions and include commercially available nonionic, anionic and cationic type emulsifiers. Examples of the non-iconic emulsifiers include, but are not limited to, polyoxyethylene nonylphenols, polyoxyethylene fatty alcohols, polyoxyethylene fatty esters and oils, polyoxypropylene/polyoxyethylene block copolymers, sorbitan fatty esters, and lanolin derivatives. Commercially available nonionic emulsifiers include Igepal® polyoxyethylene alkylphenols, PLURONIC® polyoxypropylene/polyoxyethylene block copolymers and SPAN® sorbitan fatty esters. Anionic emulsifiers include alkyl-aryl sulphonates, such as the ALKANOL® type emulsifiers from DuPont, Inc. Cationic emulsifiers include high molecular weight fatty amine blends and tertiary amines such as polyoxyethylene fatty amines. The HLB of the emulsifier system should in most instances be from about 10.5 to about 14. When emulsions containing more polar compositions such as a hydroxy end-blocked dimethylpolysiloxane are prepared, an HLB of 11 is preferred. For emulsions containing the less polar trimethylsiloxy endblocked dimethylpolysiloxanes and HLB of 13 is preferred. In order to achieve the desired emulsion characteristics, a single emulsifier may be used, or more preferably, a combination of emulsifiers is used. A nonionic emulsifier or mixture of nonionic emulsifiers is preferred.

Additives to improve or enhance appearance characteristics such as darkness and gloss, include silicone T-resins, organofunctional silicones such as; aminofunctional silicone fluids, carboxylic acid functional silicones and mercaptofunctional silicones; silicone MQ resins, silicone fluids having more than 400 repeating siloxy groups, and silicone gums. The addition of these products increases the propensity of the wipe-on polish emulsion to leave streaks and is therefore not preferred.

Antifoam compositions are those known in the art and include silicones, mineral oils, fatty acids and glycerol, alcohols, esters, salts of organic acids and tributyl phosphate. Perfumes, bacteriostats such as formalin and coloring agents may also be included.

If additives are present in the wipe-on polish emulsion, the total amount should not exceed 20 weight percent of the total emulsion including the additives.

The emulsions of the present invention are useful as polished for automotive surfaces. The compositions contain no waxes or abrasives. There is no waiting for the emulsion to dry after applying and the emulsion can be wiped out to a thin streak-free glossy film with little effort There is no dry film to buff out or dusty residue to remove.

The emulsions of the present invention may be made using common techniques known in the art for preparing emulsions. A typical technique involves mixing the surfactants with 19% to 27% of the water. Silicone and diluent are then added to the mixture. The remaining water is added with mixing. Any of several well known mixers may be used to effect the emulsification, e.g., Hobart® mixer or a Turrax® mixer. Another common technique involves mixing the surfactant, diluent and silicone fluid. An amount of water sufficient to form a dry grease is then added with mixing. The remaining water is added incrementally with mixing. Any additives are then added to the emulsion.

Having thus described the invention, the following examples are illustrative in nature and should not be construed as limiting the scope of the invention.

In the following examples all parts are by weight unless otherwise stated. Igepal® CA 887 and CA 420 are octylphenol oxethylates available from Rhône Poulenc Inc. SE 24 is a silicone containing antifoam available from Wacker Silicones Corp., Kathon CG/ICP is a bacteriostat available from Rohm & Haas.

EXAMPLE 1

Emulsion Preparation

An emulsion (A) of an OH endblocked dimethylpolysiloxane having an OH weight percent of about 1.2% and diluent is prepared by mixing 226 parts Igepal CA 887 with 343 parts of Igepal CA 420. After mixing the two emulsifiers adding 3,431 parts of the dimethylpolysiloxane. Then adding 300 parts water with mixing to form a grease. An additional 2,561 parts water is added to form a milky white emulsion with a particle size of 292 nm.

An emulsion (B) of an OH endblocked dimethylpolysiloxane and diluent, is prepared by mixing 130 parts of the dimethylpolysiloxane, 21.45 parts Igepal CA 887, 32.50 parts Igepal CA 420 and 195 parts of 1-tetradecene. 56.23 parts water is added and the mixture stirred until a dry grease is formed. An additional 213.53 parts water is added in 2 additions and mixed to form an oil-in-water emulsion. 0.65 parts each of a silicon antifoam, SE 24 and a bacteriostat Kathon CG/ICP are added to the emulsion with stirring. An milky white emulsion having a particle size of 440 nm is obtained.

An emulsion (C) of an OH endblocked dimethylpolysiloxane and diluent, is prepared by mixing 227.5 parts of the dimethylpolysiloxane, 32.5 parts Igepal CA 420, 21.45 parts Igepal 887 and 97.5 parts 1-tetradecene. 56.23 parts water is added and the mixture is stirred until a dry grease if formed. An additional 213.53 parts water is added in 2 additions and mixed to form an oil-in-water emulsion. 0.65 parts each of a silicon antifoam, SE24 and a bacteriostat Kathon CG/ICP are added to the emulsion with stirring. A milky white emulsion having a particle size of 298 nm is obtained.

Evaluation

A 1992 Ford Lincoln Town car hood is cut up into sections about 70 cm long and 21 cm wide. The color is dark green. The cut section is cleaned with anionic detergent and then rinsed thoroughly with water. 0.2 cc of wipe-on polish candidate prepared by adding a predetermined amount of emulsion to water with stirring, is added to one-half or one third of the hood section. The polish is applied with a 4"×6" cotton cloth. After the polish is distributed in a circular motion, the cloth is inverted and the treated area is polished. The gloss is measured, before and after application, using a Progloss™ instrument manufactured by Hunter Laboratories. The level of streaks are evaluated by rotating the panel in incidental sunlight The level of streaks was judged on a 0–3 scale, 0=no streaks, 3=very streaky. The same OH endblocked dimethylpolysiloxane is used in emulsions A, B and C.

The results are shown in Table 1.

TABLE 1

| Wipe-on Polish | | | | | Initial | Post | Streak | Hood |
|---|---|---|---|---|---|---|---|---|
| Emulsion | % Emulsion | % Water | % Silicone | % Diluent | Gloss | Gloss | Rating | Section |
| A | 4 | 96 | 2 | 0 | 90.3 | 76 | 3 | 1 |
| B | 4 | 96 | 0.8 | 1.2 | 90.3 | 88.3 | 0 | 1 |
| A | 4 | 96 | 2 | 0 | 70.3 | 74.6 | 3 | 2 |
| B | 10 | 90 | 2 | 3 | 70.3 | 79 | 0 | 2 |
| B | 4 | 96 | 0.8 | 1.2 | 70.3 | 80.5 | 0 | 2 |
| A | 4 | 96 | 2 | 0 | 89 | 85.9 | 3 | 3 |
| B | 10 | 90 | 2 | 3 | 89 | 89.4 | 0 | 3 |
| B | 4 | 96 | 0.8 | 1.2 | 89 | 89.5 | 0 | 3 |
| A | 4 | 96 | 2 | 0 | 87.9 | 89.9 | 2.0 | 4 |
| C | 4 | 96 | 1.4 | 0.6 | 87.9 | 86 | 0 | 4 |

EXAMPLE 2

The emulsions made in example 1 are evaluated on a 1992 GM red/-silver truck. They are applied using a cotton terry cloth. The wipe-on polish is sprayed on both the terry cloth and the truck surface. The same streak rating system was used as in Example 1. The ease of application was evaluated by a scale of 0–3 where 0=difficult to remove and 3=easily removed.

The results are shown in Table 2

TABLE 2

| Wipe-on Polish | | | | | | |
|---|---|---|---|---|---|---|
| Emulsion | % Emulsion | % Water | % Silicone | % Diluent | Streak Rating | Ease of application |
| A | 4 | 96 | 2 | 0 | 3 | 1 |
| B | 10 | 90 | 2 | 3 | 0 | 3 |
| B | 4 | 96 | 0.8 | 1.2 | 0 | 3 |
| C | 4 | 96 | 1.4 | 0.6 | 0 | 3 |

EXAMPLE 3

Several solutions of volatile diluents and OH endblocked dimethylpolysiloxanes are applied to hood sections described in example 1. Comparison is made to an emulsion of a solution of a diluent and an OH endblocked dimethylpolysiloxane. They are also compared to emulsion of the OH endblocked dimethylpolysiloxane. T h e OH endblocked dimethylpolysiloxane used has OH content of approximately 1.2%. Each formula contains 20% OH endblocked dimethylpolysiloxane.

The results are shown in Table 3.

TABLE 3

| % Emulsion | Diluent | % Silicone | % Diluent | Streak Rating |
|---|---|---|---|---|
| 0% | Heptane | 20 | 80 | 3 |
| 0% | Tetradecene | 20 | 80 | 2 |

TABLE 3-continued

| % Emulsion | Diluent | % Silicone | % Diluent | Streak Rating |
|---|---|---|---|---|
| 40% (A) | None | 20 | 0 | 2.5 |
| 100% (B) | Tetradecene | 20 | 30 | 0 |

EXAMPLE 4

Emulsion Preparation

An emulsion (D) of a solution consisting of an OH endblocked dimethylpolysiloxane and octamethylcyclotetrasiloxane is prepared by mixing 37.5 parts of Igepal CA 887, 24.8 parts Igepal CA 420 and 64.9 parts of water. To the resultant viscous thixotropic mixture is added 375 parts of a solution consisting of 150 parts of an OH endblocked dimethylpolysiloxane having an OH weight percent of about 1.2% and 225 of octamethylcyclotetrasiloxane. 246.4 parts of water are added slowly. A milky white-emulsion is obtained.

An emulsion (E) of a solution consisting of an OH endblocked dimethylpolysiloxane and heptane is prepared by mixing 37.5 parts of Igepal CA 887, 24.8 parts Igepal CA 420 and 64.9 parts of water. To the resultant viscous thixotropic mixture is added 375 parts of a solution consisting of 150 parts of an OH endblocked dimethylpolysiloxane having an OH weight percent of about 1.2% and 225 of heptane. 246.4 parts of water are added slowly. A milky white emulsion is obtained.

An emulsion (F) of a solution consisting of an OH endblocked dimethylpolysiloxane and decamethylcyclopentasiloxane is prepared by mixing 37.5 parts of Igepal CA 887, 24.8 parts Igepal CA 420 and 64.9 parts of water. To the resultant viscous thixotropic mixture is added 375 parts of a solution consisting of 150 parts of an OH endblocked dimethylpolysiloxane having an OH weight percent of about 1.2% and 225 of decamethylcyclopentasiloxane. 246.4 parts of water are added slowly. A milky white emulsion is obtained.

Four wipe-on polish compositions are evaluated for streaks in accordance to the procedure in example 1.

The results are shown in Table 4.

TABLE 4

| % Emulsion | Diluent | % Silicone | % Diluent | Rating Streak |
|---|---|---|---|---|
| 100% B | Tetradecene | 20 | 30 | 0 |
| 100% D | D4 | 20 | 30 | 2 |
| 100% E | Heptane | 20 | 30 | 3 |
| 100% F | D5 | 20 | 30 | 0.75 |

What is claimed is:

1. A wipe-on polish composition, which contains no wax or abrasive component, consisting essentially of an oil-in-water emulsion having
   (A) 0.25 to 20 weight percent of a fluid organopolysiloxane with a viscosity which does not exceed 1000 centistokes at 25° C. of the formula $$(R_aSiO_{4-a/2})_n \quad (I)$$

where
   R is independently a monovalent hydrocarbon radical having from 1 to 18 carbon atoms, an hydroxy radical or hydrocarbonoxy radical having from 1 to 18 carbon atoms,
   a is on average per unit of the organopolysiloxane of formula (I) from 0.7 to 2.6, and
   n is from 2 to 400,
   (B) 0.6 to 30 weight percent of a volatile diluent having a boiling point of about 213° C. to about 350° C. at atmospheric pressure and in which the organopolysiloxane of formula (I) is soluble,
   (C) 0.2 to 8 weight percent of an emulsifier,
   (D) 30 to 96.75 weight percent water, and
   (E) 0 to 20 weight percent of additives or mixtures of additives selected from the group consisting of gloss enhancers, antifoam agents, perfumes, bacteriostats and coloring agents, where the weight percent of the emulsion is based on the total weight of the wipe-on polish composition.

2. A wipe-on polish composition as claimed in claim 1, wherein the fluid organopolysiloxane has the formula $$HOR_2SiO\,(R_2SiO)_n\,H \quad (II)$$

where
   R is an alkyl radical, and
   n is from 2 to 400.

3. A wipe-on polish composition as claimed in claim 2, wherein R is a methyl radical.

4. A wipe-on polish composition as claimed in claim 1, wherein the diluent has a boiling point at atmospheric pressure of from 213° C. to 275° C.

5. A wipe-on polish composition as claimed in claim 1, wherein the emulsifier is a nonionic emulsifier or mixture of nonionic emulsifiers.

6. A wipe-on polish composition as claimed in claim 5, wherein the emulsifier is a mixture of polyoxyethylene alkyl phenols.

7. A wipe-on polish composition which contains no wax or abrasive component, comprising,
   A from 0% to 96% by weight water, and
   B from 4% to 100% by weight of an emulsion as claimed in claim 1.

8. A wipe-on polish composition which contains no wax or abrasive component consisting essentially of; an oil-in-water emulsion having,
   (A) 0.25 to 20 weight percent of a fluid organopolysiloxane with a viscosity which does not exceed 1000 centistokes at 25° C. of the formula $$(R_aSiO_{4-a/2})_n \quad (I)$$

where
   R is independently a monovalent hydrocarbon radical having from 1 to 18 carbon atoms, an hydroxy radical or a hydrocarbonoxy radical having from 1 to 18 carbon atoms,
   a is on average per unit of the organopolysiloxane of formula (I) from 0.7 to 2.6, and
   n is from 2 to 400,
   (B) 0.6 to 30 weight percent of volatile cyclic methylsiloxane having more than 4 silicon atoms diluent having a boiling point of about 205° C. to about 350° C. at atmospheric pressure and in which the organopolysiloxane of formula (I) is soluble,
   (C) 0.2 to 8 weight percent of an emulsifier,
   (D) 30 to 96.75 weight percent water, and
   (E) 0 to 20 weight percent of additives or mixtures of additives selected from the group consisting of, gloss enhancers, antifoam agents, perfumes, bacteriostats and coloring agents, where the weight percent of the emulsion is based on the total weight of the wipe-on polish composition.

9. A wipe-on polish composition of claim 8, where the diluent is decamethylcyclopentasiloxane.

10. A wipe-on polish composition which contains no wax or abrasive component, comprising;
    (A) from 0% to 96% by weight water, and
    (B) from 4% to 100% by weight of an emulsion as claimed in claim 8.

11. A wipe-on polish composition, which contains no wax or abrasive component, consisting essentially of an oil-in-water emulsion having
    (A) 0.25 to 20 weight percent of a fluid organopolysiloxane with a viscosity which does not exceed 1000 centistokes at 25° C. of the formula $$(R_aSiO_{4-a/2})_n \quad (I)$$

where
    R is independently a monovalent hydrocarbon radical having from 1 to 18 carbon atoms, an hydroxy radical or hydrocarbonoxy radical having from 1 to 18 carbon atoms,
    a is on average per unit of the organopolysiloxane of formula (I) from 0.7 to 2.6, and
    n is from 2 to 400,
    (B) 0.6 to 30 weight percent of a volatile diluent having a boiling point of about 213° C. to about 350° C. at atmospheric pressure and in which the organopolysiloxane of formula (I) is soluble,
    (C) 0.2 to 8 weight percent of an emulsifier,
    (D) 30 to 96.75 weight percent water, and (E) 0 to 20 weight percent of additives or mixtures of additives selected from the group consisting of gloss enhancers, antifoam agents, perfumes, bacteriostats and coloring agents, where the weight percent of the emulsion is based on the total weight of the wipe-on polish composition;

wherein said volatile diluent is an alpha-olefin having 12 to 18 carbon atoms or a hydroxybenzoic acid ester.

12. A wipe-on polish composition as claimed in claim 11, where the diluent is 1-tetradecene or methylsalicylate.

* * * * *